(No Model.)
F. C. STARKE & P. J. CROWLEY.
BREAKING DOWN SHOVEL.
No. 271,940.                    Patented Feb. 6, 1883.
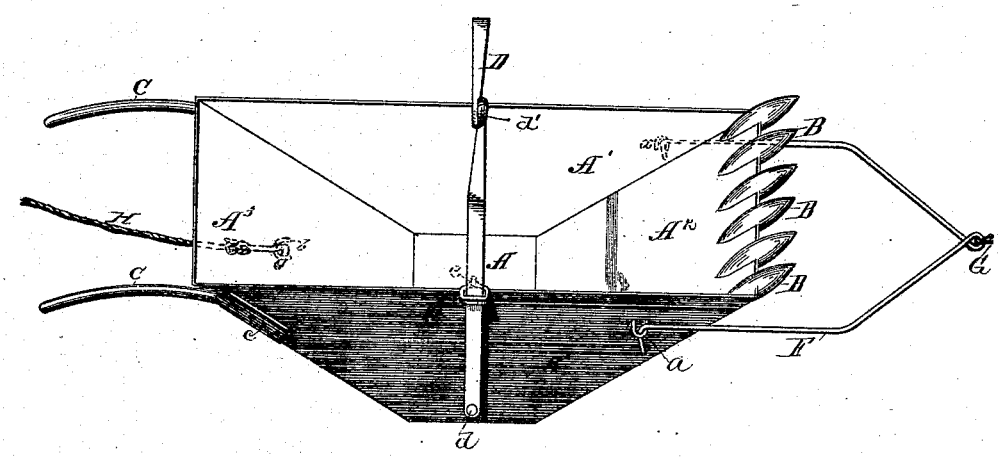

UNITED STATES PATENT OFFICE.

FRED C. STARKE AND PETER J. CROWLEY, OF MILWAUKEE, WISCONSIN.

BREAKING-DOWN SHOVEL.

SPECIFICATION forming part of Letters Patent No. 271,940, dated February 6, 1883.

Application filed November 23, 1882. (No model.)

*To all whom it may concern:*

Be it known that we, FRED C. STARKE and PETER J. CROWLEY, both of Milwaukee, in the county of Milwaukee, and in the State of Wisconsin, have invented certain new and useful Improvements in Breaking-Down Shovels; and we do hereby declare that the following is a full, clear, and exact description thereof.

Our invention relates to that class of shovels which are operated by power, and is especially designed for work "athwartships," in "breaking down" the coal, ore, or other load of a vessel, in order to obtain sufficient space for the operation of our steam-shovel, bucket, &c., patented September 5, 1882, (which latter devices are designed to work "fore and aft" when applied to the task of removing material in the hold of a vessel;) and our present invention consists in certain peculiarities of construction of said shovel, as will be more fully set forth hereinafter.

The figure on the drawing is a perspective view of our device, which is a combination of shovel and bucket, and consists primarily of a flat transverse oblong bottom, A, with vertical sides A' A' and flaring ends A² A³, the forward end being provided with the teeth B B B, to enable our shovel to more readily penetrate the mass of material to be unloaded, while at the rear are two handles, C C, secured at the points c to the outer rear flaring edges of the sides A' A'. D is the hoisting-bail, and this is pivoted at the points d to the lower central part of the sides, quite near the bottom, and the bail is provided with a locking plate or link, E, working in connection with a locking-pin, e, (shown in dotted lines,) exactly as in our patent hereinbefore referred to. Staples a a are secured to the outside of the forward parts of the sides A' A', to receive the hooked ends of the draft-bail F, to which the cable or chain G is attached, while a similar staple, b, (shown in dotted lines,) is secured to the outside of the rear end, A³, at about its center, for the attachment of the hook of the other cable, H.

The operation of our device will be readily understood from the foregoing description of its construction. The shovel is placed thwartships, and the bail D is unlocked and thrown back toward the rear end, A³, so as to be out of the way, and the forward end, A², is forced down till the teeth B B B are horizontal, and then, power being applied to the forward cable, G, the device is pulled into the coal or other material, its entrance being greatly facilitated by the said teeth, an operator meanwhile having hold of the handles C C and guiding the shovel, after the manner of holding a plow. As soon as the shovel is full the operator bears down upon the handles, and thereby rights the shovel, so that it rests on its true bottom A, instead of on the front end, A², and then the power is reversed and the loaded shovel is drawn back, by means of the cable H, to the hoisting-point, when the cables are released by raising the hooks attached to them, or to their links or bails, out of the staples a a b on the said shovel, and the hoisting-bail D is raised to a vertical position and locked by the plate E and pin e, and the operator next attaches the hoisting-rope to the loop d' in the top of the bail D, when the loaded shovel is at once hoisted and emptied, and then lowered to be again filled, and this is continued until the cargo is sufficiently broken down to afford room for the operation of our fore-and-aft shovels and buckets already patented, and hereinbefore referred to.

The hooks which connect with the staples a a b may be either bent downward, as shown in the drawing, or, when this would render them liable to be pushed out of the staples by the material in which our shovel was working, these hooks may be bent upward or forward, as deemed necessary.

Having thus described our invention, what we claim as new, and desire to secure by Letters Patent, is—

1. A breaking-down shovel provided with teeth at one end and handles at the other, substantially as set forth.

2. A breaking-down shovel provided with teeth at one end and handles at the other, together with a hoisting-bail and a device for locking said bail in a vertical position, and staples for the attachment of power-cables, substantially as set forth.

3. A breaking-down shovel consisting of the transverse oblong flat bottom A, vertical sides A' A', flaring ends A² A³, teeth B B B, and handles C C, substantially as described.

4. The breaking-down shovel described, consisting of the transverse oblong flat bottom A, vertical sides A' A', flaring ends A² A³, teeth B B B, handles C C, hoisting-bail D, locking device E e, draft-bail F, and staples, substantially as described.

In testimony that we claim the foregoing we have hereunto set our hands, on this 16th day of November, 1882, in the presence of two witnesses.

FRED C. STARKE.
PETER J. CROWLEY.

Witnesses:
S. S. STOUT,
H. G. UNDERWOOD.